United States Patent [19]

Smagner

[11] 4,439,947
[45] Apr. 3, 1984

[54] TRAP INSERT
[76] Inventor: John D. Smagner, 282 W. 12th St., Elmira, N.Y. 14903
[21] Appl. No.: 424,739
[22] Filed: Sep. 27, 1982
[51] Int. Cl.³ .............................................. A01M 23/26
[52] U.S. Cl. ........................................................ 43/96
[58] Field of Search ........................ 43/88, 92, , 93, 96
[56] References Cited
U.S. PATENT DOCUMENTS

| | | | |
|---|---|---|---|
| 129,203 | 7/1872 | Allen | 43/96 |
| 1,585,425 | 5/1926 | Shelton | 43/96 |
| 1,587,807 | 6/1926 | Thoreson | 43/96 |

Primary Examiner—Nicholas P. Godici
Assistant Examiner—P. Weston Musselman, Jr.

[57] ABSTRACT

This invention relates to an insert for jaw traps. The insert is a resilient device which extends between the bait pan and the jaws, when they are in their open position. A slot extends through the entire thickness of the insert between the outer periphery thereof and the aperture which receives the bait pan. Support means maintains the top surface of the insert at a level that is at or near the topmost surface of the set jaws.

7 Claims, 6 Drawing Figures

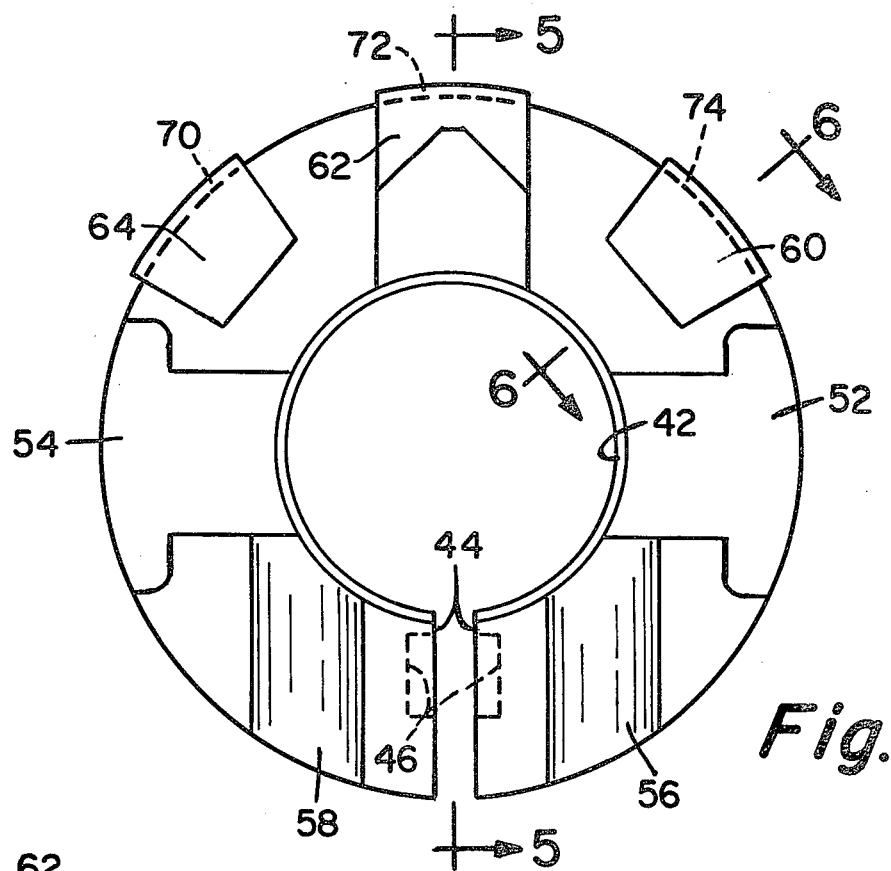
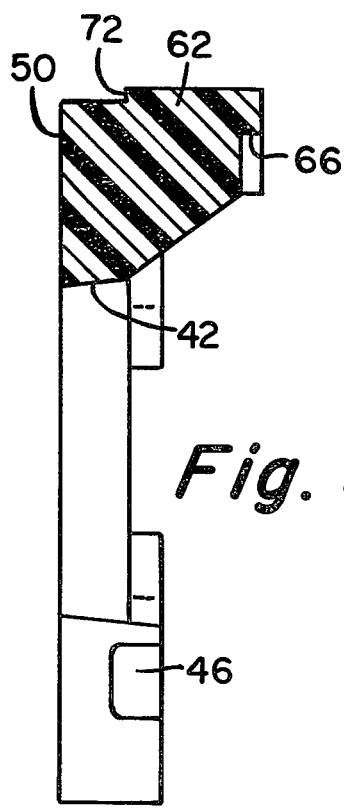
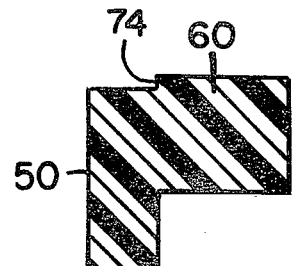

TRAP INSERT

BACKGROUND OF THE INVENTION

This invention relates to steel traps, and more particularly, to inserts for such traps which facilitate the setting and concealment thereof.

During the setting of traps, particularly those that are set on land, it is essential that the trap be bedded into the ground and that it be concealed so that the trap and surrounding area appears natural. After they are set, traps should be covered with a natural material such as dirt, clay, sand, snow or the like. When dirt or kindred material is placed on and around parts of a trap, care must be taken to keep such material away from the bait pan, the bait pan arm and the dog or latch bar. For example, if dirt or other material gets beneath the bait pan, it can prevent the proper triggering of the trap. Even when such components are free from dirt and the like when the trap is set, rain can dislodge it and cause it to fall under or upon these trap components, thereby impairing proper operation of the trap. Dirt and kindred material can be especially bothersome when they encounter a freezing rain.

Various tools and guards have been developed for the purpose of facilitating the setting of traps. U.S. Pat. No. 4,230,355 discloses a tool which permits dirt to be packed in the region of a set trap between the open jaws and the bait pan, while preventing dirt from getting too close to the bait pan. The method of that patent is disadvantageous in that the employment thereof to set or to remake a trap takes a few minutes at best. Also, water from rain and melting snow can clog the trap by eroding dirt against the jaws, levers and other trap parts, thus impairing operation of the trap. Furthermore, dirt within the trap jaws can become compacted by rain, thereby forming a depression which can alert an animal to the presence of the trap.

U.S. Pat. Nos. 1,231,406 and 1,868,714 disclose guards which are disposed under the bait pan of a set trap to prevent dirt from being packed beneath the pan. The guards consist of upper and lower surfaces such as plates which are spaced apart by a coiled spring which is held under tension. A fabric hood covers the top and sides of the guard. The device is placed below and in close contact with the bait pan when the trap is set. When the trap is covered with dirt or kindred material for the purpose of concealment, the tension afforded by the spring prevents the weight of such materials from depressing the trigger. Under the influence of an animal of proper weight, the trigger is usually depressed to effect release of the jaws. However, when such fabric covered guards are subjected to rain, ice or snow, their presence may hinder operation of the trap. For example, the fabric may become wet with rain or snow which can thereafter freeze. The resultant device beneath the bait pan can prevent a trap from being triggered by the desired animal.

SUMMARY OF THE INVENTION

It is therefore an object of the present invention to provide a device that can shorten the time needed for setting a trap. Another object is to provide a device that stabilizes and ensures proper operation of a trap even after it has been exposed to rain or freezing conditions. Another object is to provide a device that faciliates the setting and operation of traps in the rain. The device of the present invention pertains to an insert for use in combination with an animal trap. The trap conventionally comprises a frame, a pair of jaws rotatably mounted on the frame, a pan located between the jaws when the jaws are in the set position, and spring means on the frame to urge the jaws toward each other from their set position. Means are provided for pivotally mounting the pan on the frame. A dog pivotally mounted on the frame is adapted to contact the pan and hold the jaws in the set position.

The trap insert of the present invention comprises a disc-shaped device of resilient material situated within and in close tolerance to the jaws when the jaws are in the set position. The insert has a centrally-located aperture which is of the same shape as the pan and slightly larger than the pan. The insert has a slot extending through its entire thickness between the aperture and its outer periphery for receiving the dog. The insert also includes support means for maintaining the top surface thereof at a level that is at or near the topmost surface of the jaws when they are in their set position.

The support means preferably comprises a plurality of legs which are separated by notches whereby the insert readily folds when the trap is triggered. One of the support legs may be provided with a recess for receiving a part of the frame, namely the foot of the trap. The insert may also include indentations for receiving the spring means. The wall that forms the aperture may be tapered, the topmost portion of the aperture having the smallest diameter, whereby the pan can be depressed through the aperture without binding therein.

BRIEF DESCRIPTION OF THE DRAWINGS

FIG. 4 is a bottom view of the trap insert.

FIG. 5 is a cross-sectional view taken along lines 5—5 of FIG. 4.

FIG. 6 is a cross-sectional view taken along lines 6—6 of FIG. 4.

DESCRIPTION OF THE PREFERRED EMBODIMENT

Figure 1:
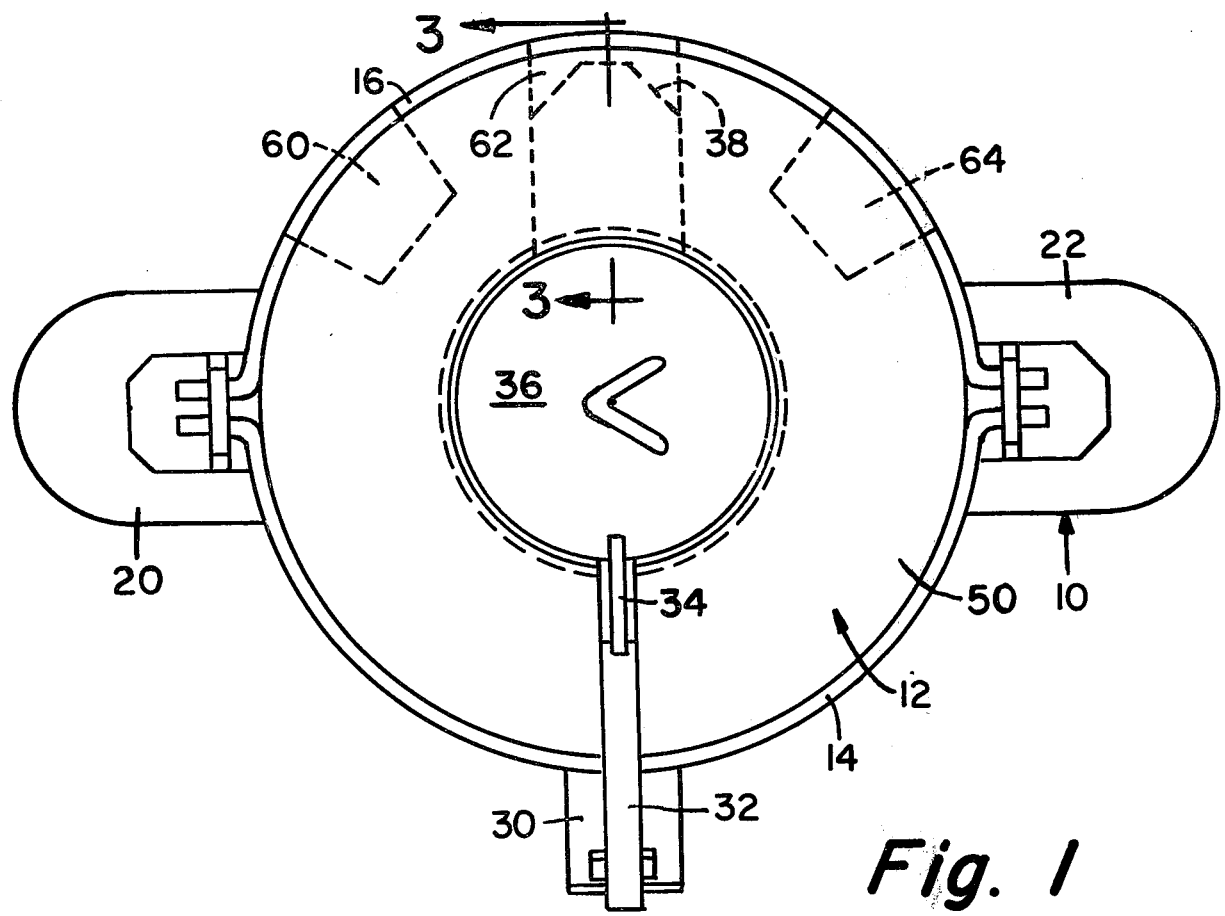
FIG. 1 is a plan view of an animal trap which incorporates the insert of the present invention.
Figure 2:
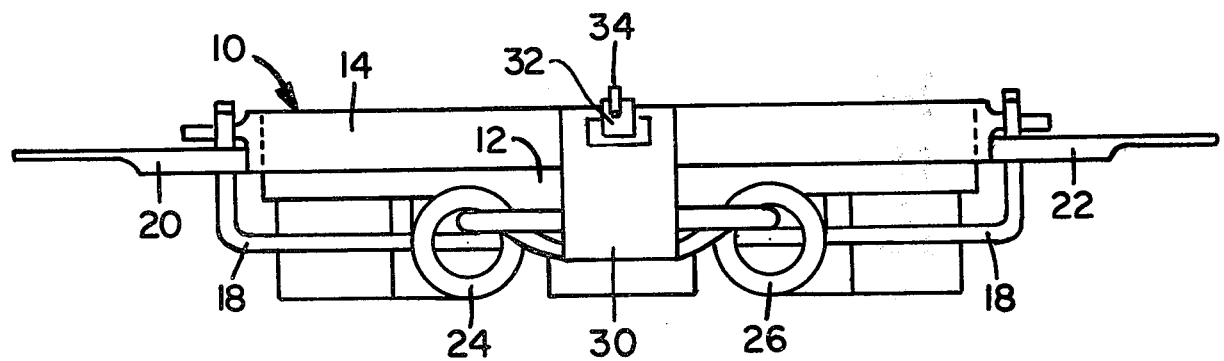
FIG. 2 is a side elevation of the combination illustrated in FIG. 1.
Figure 3:
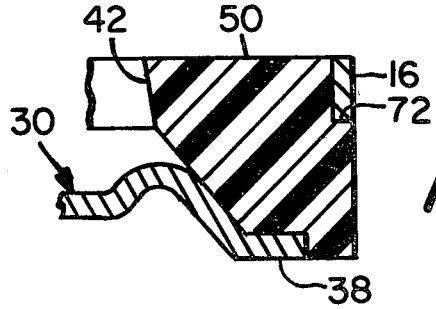
FIG. 3 is a fragmentary, cross-sectional view taken along lines 3—3 of FIG. 1.

FIGS. 1 and 2 illustrate a conventional coiled spring trap 10 into which trap insert 12 has been positioned. The insert can also be employed in other types of jaw traps such as underspring, single and double long-spring or the like. Trap 10 comprises a pair of jaws 14 and 16 which are rotatably mounted on frame 18. Pivotally mounted on frame 18 is a pair of spring levers 20 and 22 which are connected to the ends of coiled springs 24 and 26, respectively. The remaining ends of springs 24 and 26 bear against cross member 30, the center of which is affixed to frame 18. Latch 32, which is pivotally connected to the end of cross member 30, is adapted to engage a notch in an arm 34 to which pan 36 is affixed. The end of cross member 30 opposite latch 32 terminates in a foot 38.

As shown in FIG. 1 insert 12 is situated within jaws 14 and 16 in close tolerance thereto. Insert 12, which is shown in greater detail in FIGS. 3 through 6, has a central aperture formed by wall 42. The aperture-forming wall is closely spaced from pan 36. Wall 42 is tapered, and there is preferably a slight gap between these two members to ensure the free movement of pan 36 into the aperture when depressed by an animal paw. A slot is defined by walls 44 which are in close tolerence to the outside dimensions of latch 32. As shown in FIG. 5, each of the slot-forming walls 44 contains a cavity 46 which receives the nut, bolt or other means for pivotally attaching arm 34 to cross member 30.

The top surface 50 of insert 12 is flush with the top surface of jaws 14 and 16. Various portions of the under surface of insert 12 rest upon the adjacent components of trap 10. Indentations 52 and 54 receive the spring levers 20 and 22, respectively. Curved indentations 56 and 58 receive the tops of coiled springs 24 and 26, respectively. The end of the insert opposite the slot is provided with three legs 60, 62 and 64 which provide firmness and stability to the trap. Leg 62 has a recess 66 which receives foot 38 to provide additional firmness. If desired, leg 62 can contain a slot rather than a recess, whereby a part of the leg extends below the trap foot. Legs 60, 62 and 64 are preferably provided with ledges 70, 72 and 74, respectively, which support jaw 16, thereby aiding in the reduction of trap wobble. The width of the ledge is preferably the same as the thickness of jaw 16. If an animal steps on jaw 16, the trap tends not to wobble because of the stability afforded by legs 60, 62, 64, ledges 70, 72 and 74 and recess 66.

When a trap is snapped, spring levers 20 and 22 move upwardly in order to urge jaws 14 and 16 toward each other. Insert 12 must bend when the trap is snapped so that it does not bind the jaws as levers 20 and 22 move upwardly. Insert 12 is therefore formed of a flexible material such as neoprene rubber, silicone rubber or the like. The construction of the insert also aids its flexibility. The slot formed by walls 44 extends through the entire thickness of the insert. The use of three separate legs 60, 62 and 64 rather than a single, elongated support also adds flexibility. Insert 12 is placed inside the jaws of a set trap to function as a substitute for the natural material which is conventionally placed around the bait pan. After the insert is placed in the trap and the trap is located in the desired position on the ground, a small amount of covering is placed over the entire trap and insert, and the concealment operation is completed without clogging or otherwise hindering trap jaw movement. Use of the insert thus speeds the operation of setting traps.

The covering material that is employed to conceal conventional traps can clog the trap when wet, thereby slowing the closing action of the jaws and reducing the effectiveness of the trap. A trap having an insert according to the present invention is merely inspected to ascertain whether the rain has eroded any covering material, thus uncovering any portion of the trap or insert. The remaking of a trap which has become unconcealed takes only a few minutes.

The insert can be colored to match the natural color of the region in which it is to be used. For example, it could be colored white for use in snow or tan for use in sand. An additional advantage of using the insert in snow is that it is resistant to freezing. The upper surface of the insert is preferably sufficiently rough that it provides resistance to an animal paw slipping across it. Surface roughness also prevents dirt from readily washing therefrom in the rain.

The insert can also be employed to set traps under water. When used in this environment, the insert prevents extraneous material from getting into the trap and hindering its operation.

I claim:

1. An insert for use in combination with an animal trap having a frame, a pair of jaws rotatably mounted on said frame, a pan located between said jaws when said jaws are in the set position, spring means on said frame to urge said jaws toward each other from a set position, means pivotally mounting said pan on said frame, and a dog adapted to contact said pan and hold said jaws in the set position, said insert comprising a disc-shaped device of resilient material having a flat top surface parallel to the top surface of said pan and substantially filling the area between said pan and said jaws when in their set position, said insert having a centrally located aperture which is of the same shape as said pan and slightly larger than said pan, said insert having a slot extending through its entire thickness between said aperture and the outer periphery thereof for receiving said dog, and support means for maintaining the flat, top surface of said insert at a level that is at or near the topmost surface of said jaws when in the set position.

2. A trap insert in accordance with claim 1 wherein said support means comprises a plurality of legs separated by notches whereby said insert readily folds when said trap is triggered.

3. A trap insert in accordance with claim 2 wherein one of said legs is provided with a recess for receiving a part of said frame.

4. A trap insert in accordance with claim 3 which further comprises a plurality of indentations for receiving said spring means.

5. A trap insert in accordance with claim 4 wherein the wall that forms said aperture is tapered such that the topmost portion of said aperture has the smallest diameter.

6. A trap insert in accordance with claim 5 which further comprises at least one ledge in the vicinity of said legs for receiving the adjacent jaw.

7. A trap insert in accordance with claim 1 which further comprises a plurality of indentations which overlie and are in contact with said spring means, said insert being sufficiently flexible that it is capable of bending when contacted by said spring means when said trap is triggered.

* * * * *